United States Patent
Fu et al.

(10) Patent No.: US 12,169,715 B2
(45) Date of Patent: Dec. 17, 2024

(54) CODE REVIEW COMMENT GENERATION VIA RETRIEVAL-AUGMENTED TRANSFORMER WITH CHUNK CROSS-ATTENTION

(71) Applicant: MICROSOFT TECHNOLOGY LICENSING, LLC., Redmond, WA (US)

(72) Inventors: Shengyu Fu, Redmond, WA (US); Xiaoyu Liu, Sammamish, WA (US); Neelakantan Sundaresan, Bellevue, WA (US); Alexey Svyatkovskiy, Bellevue, WA (US)

(73) Assignee: Microsoft Technology Licensing, LLC., Redmond, WA (US)

( * ) Notice: Subject to any disclaimer, the term of this patent is extended or adjusted under 35 U.S.C. 154(b) by 66 days.

(21) Appl. No.: 18/074,994

(22) Filed: Dec. 5, 2022

(65) Prior Publication Data
US 2024/0184570 A1    Jun. 6, 2024

(51) Int. Cl.
G06F 8/77    (2018.01)
G06F 8/33    (2018.01)

(52) U.S. Cl.
CPC ............... *G06F 8/77* (2013.01); *G06F 8/33* (2013.01)

(58) Field of Classification Search
None
See application file for complete search history.

(56) References Cited

U.S. PATENT DOCUMENTS

| | | | |
|---|---|---|---|
| 11,604,626 B1* | 3/2023 | Sawant | G06F 8/75 |
| 2019/0228319 A1* | 7/2019 | Gupta | G06F 8/71 |
| 2020/0249918 A1* | 8/2020 | Svyatkovskiy | G06N 3/084 |
| 2020/0293617 A1* | 9/2020 | Luo | G06N 3/08 |
| 2022/0164626 A1* | 5/2022 | Bird | G06F 8/311 |

FOREIGN PATENT DOCUMENTS

WO    2019143539 A1    7/2019

OTHER PUBLICATIONS

Li et al. "Automating Code Review Activities by Large-Scale Pre-training" hereinafter Li, ESEC/FSE '22, Nov. 14-18, 2022, Singapore, Singapore, retrieved from < https://dl.acm.org/doi/pdf/10.1145/3540250.3549081>). (Year: 2022).*

(Continued)

*Primary Examiner* — Marina Lee

(57) ABSTRACT

A retrieval-augmented neural transformer model with chunk cross-attention predicts a code review given a proposed source code change, represented as a code diff hunk, and a set of historical code review comments. The code diff hunk represents proposed edits to a source code snippet with its surrounding context that has not been changed. The historical code review comments are associated with code edits that are semantically similar to the proposed source code changes. The code diff hunk is partitioned into chunks which are used to find semantically similar historical code review comments. The set of historical code review comments is aggregated and used to guide the model in makings its predictions.

20 Claims, 8 Drawing Sheets

(56) References Cited

OTHER PUBLICATIONS

Chouchen et al. "WhoReview: A multi-objective search-based approach for code reviewers recommendation in modern code review", Applied Soft Computing Journal 100 (2021) 106908, retrieved from <https://mkaouer.net/publication/chouchen-2021-whoreview/chouchen-2021-whoreview.pdf. (Year: 2021).*

Fagan, "Design and code inspections to reduce errors in program development", IBM Systems Journal ( vol. 15, Issue: 3, 1976), retrieved from <https://ieeexplore.ieee.org/stamp/stamp.jsp?tp=&arnumber=5388086>. (Year: 1976).*

"GitHub Copilot", Retrieved from: https://web.archive.org/web/20210927023930/https://copilot.github.com/, Sep. 27, 2021, 16 Pages.

Ahmad, et al., "Unified Pre-Training for Program Understanding and Generation", In Proceedings of Conference of the North American Chapter of the Association for Computational Linguistics: Human Language Technologies, Jun. 6, 2021, pp. 2655-2668.

Bacchelli, et al., "Expectations, Outcomes, and Challenges of Modern Code Review", In Proceedings of the 35th International Conference on Software Engineering, May 18, 2013, pp. 712-721.

Beller, et al., "Modern code reviews in open-source projects: which problems do they fix?", In Proceedings of Working Conference on Mining Software Repositories, May 21, 2014, 10 Pages.

Borgeaud, et al., "Improving language models by retrieving from trillions of tokens", In Proceedings of the 39th International Conference on Machine Learning, vol. 162, Jun. 28, 2022, 35 Pages.

Bosu, et al., "Impact of Peer Code Review on Peer Impression Formation: A Survey", In Proceedings ACM/IEEE International Symposium on Empirical Software Engineering and Measurement, Oct. 10, 2013, pp. 133-142.

Brown, et al., "Language models are few-shot learners", In Proceedings of the 34th International Conference on Neural Information Processing Systems, Dec. 6, 2020, pp. 1-75.

Chen, et al., "Evaluating Large Language Models Trained on Code", In Repository of arXiv:2107.03374v2, Jul. 14, 2021, 35 Pages.

Chiang, et al., "Breaking Down Multilingual Machine Translation", In Findings of the Association for Computational Linguistics: ACL 2022, May 22, 2022, pp. 2766-2780.

Devanbu, et al., "Deep learning & software engineering: State of research and future directions", In Repository of arXiv:2009.08525v1, Sep. 17, 2020, pp. 1-37.

Devlin, et al., "BERT: Pre-training of Deep Bidirectional Transformers for Language Understanding", In Repository of arXiv:1810.04805v1, Oct. 11, 2018, 14 Pages.

Feng, et al., "Codebert: A Pre-Trained Model for Programming and Natural Languages", In Proceedings of the Conference on Empirical Methods in Natural Language Processing: Findings, EMNLP, Nov. 16, 2020, pp. 1536-1547.

Guo, et al., "GraphCodeBert: Pre-Training Code Representations with Data Flow", In Proceedings of International Conference on Learning Representations, 2021, 18 Pages.

Guo, et al., "UniXcoder: Unified Cross-Modal Pre-training for Code Representation", In Repository of arXiv:2203.03850v1, Mar. 8, 2022, 14 Pages.

Gupta, et al., "Intelligent code reviews using deep learning", In Proceedings of the 24th ACM SIGKDD International Conference on Knowledge Discovery & Data Mining, Aug. 20, 2018, 9 Pages.

Hellendoorn, et al., "Towards Automating Code Review at Scale", In Proceedings of the 29th ACM Joint Meeting on European Software Engineering Conference and Symposium on the Foundations of Software Engineering, Aug. 23, 2021, pp. 1479-1482.

Heumüller, et al., "Exploit Those Code Reviews! Bigger Data for Deeper Learning", In Proceedings of the 29th ACM Joint Meeting on European Software Engineering Conference and Symposium on the Foundations of Software Engineering, Aug. 23, 2021, pp. 1505-1509.

Hindle, et al., "On the Naturalness of Software", In Journal of Communications of the ACM, vol. 59, Issue 5, May 2016, pp. 122-131.

Wang, et al., "CodeT5: Identifier-aware Unified Pre-trained Encoder-Decoder Models for Code Understanding and Generation", In Proceedings of the 2021 Conference on Empirical Methods in Natural Language Processing, Nov. 7, 2021, pp. 8696-8707.

Watson, et al., "A Systematic Literature Review on the Use of Deep Learning in Software Engineering Research", In Journal of ACM Transactions on Software Engineering and Methodology, vol. 31, Issue 2, Mar. 4, 2022, 58 Pages.

Yang, et al., "Mining the modern code review repositories: a dataset of people, process and product", In Proceedings of IEEE/ACM 13th Working Conference on Mining Software Repositories, May 14, 2022, pp. 460-463.

Zanjani, et al., "Automatically recommending peer reviewers in modern code review", In Journal of IEEE Transactions on Software Engineering, vol. 42, Issue 6, Nov. 12, 2015, pp. 530-543.

Zhu, et al., "Multilingual Code Snippets Training for Program Translation", In Proceedings of the AAAI Conference on Artificial Intelligence, vol. 36, Issue 10, Jun. 28, 2022, pp. 11783-11790.

"CodeBERT", Retrieved From: https://github.com/microsoft/CodeBERT/tree/master/CodeReviewer, Retrieved On: Nov. 25, 2022, 4 Pages.

International Search Report and Written Opinion received for PCT Application No. PCT/US23/036827, mailed on Feb. 16, 2024, 17 pages.

"From Research to Production", Retrieved From: https://pytorch.org/, Retrieved On: Nov. 25, 2022, 4 Pages.

"Gerrit Code Review", Retrieved From: https://www.gerritcodereview.com/, Retrieved On: Nov. 25, 2022, 3 Pages.

"Let's build from here", Retrieved From: https://github.com/, Retrieved On: Nov. 25, 2022, 14 Pages.

"The AI community building the future", Retrieved From: https://huggingface.co/, Retrieved On: Nov. 25, 2022, 8 Pages.

Li, et al., "Automating code review activities by large-scale pre-training", In Proceedings of the 30th ACM Joint European Software Engineering Conference and Symposium on the Foundations of Software Engineering, Nov. 9, 2022, pp. 1035-1047.

Beller, et al., "Modern code reviews in open-source projects: which problems do they fix?", In Proceedings of Working Conference on Mining Software Repositories, May 31, 2014, 10 Pages.

Brown, et al., "Language models are few-shot learners", In Proceedings of the 34th International Conference on Neural Information Processing Systems, Dec. 6, 2020, 25 Pages.

Chiang, et al., "Breaking Down Multilingual Machine Translation", In Journal of Computing Research Repository, Oct. 15, 2021, 15 Pages.

Guo, et al., "GraphCodeBert: Pre-Training Code Representations with Data Flow", In Proceedings of International Conference on Learning Representations, May 3, 2021, 18 Pages.

Husain, et al., "CodeSearchNet Challenge: Evaluating the State of Semantic Code Search", In Journal of Computing Research Repository, Sep. 20, 2019, 6 Pages.

Kanade, et al., "Learning and Evaluating Contextual Embedding of Source Code", In Proceedings of 37th International Conference on Machine Learning, Jul. 13, 2020, 12 Pages.

Lewis, et al., "BART: Denoising Sequence-to-Sequence Pre-training for Natural Language Generation, Translation, and Comprehension", In Repository of arXiv:1910.13461v1, Oct. 29, 2019, 10 Pages.

Li, et al., "Deepreview: automatic code review using deep multi-instance learning", In Proceedings of Pacific-Asia Conference on Knowledge Discovery and Data Mining, Apr. 14, 2019, pp. 318-330.

Liu, et al., "RoBERTa: A Robustly Optimized BERT Pretraining Approach", In Repository of arXiv:1907.11692v1, Jul. 26, 2019, 13 Pages.

Lu, et al., "CodeXGLUE: A Machine Learning Benchmark Dataset for Code Understanding and Generation", In Proceedings of 35th Conference on Neural Information Processing Systems Track on Datasets and Benchmarks, Jun. 3, 2021, 16 Pages.

Mukadam, et al., "Gerrit software code review data from android", In Proceedings of 10th Working Conference on Mining Software Repositories, May 18, 2013, pp. 45-48.

(56) References Cited

OTHER PUBLICATIONS

Paixao, et al., "CROP: Linking Code Reviews to Source Code Changes", In Proceedings of IEEE/ACM 15th International Conference on Mining Software Repositories, May 27, 2018, pp. 46-49.
Papineni, et al., "BLEU: a method for automatic evaluation of machine translation", In Proceedings of the 40th Annual Meeting on Association for Computational Linguistics, Jul. 7, 2002, pp. 311-318.
Raffel, et al., "Exploring the Limits of Transfer Learning with a Unified Text-to-Text Transformer", In Journal of Machine Learning Research, vol. 21, Issue 140, Jun. 21, 2020, pp. 1-67.
Rigby, et al., "Convergent contemporary software peer review practices", In Proceedings of the 9th joint meeting on foundations of software engineering, Aug. 18, 2013, pp. 202-212.
Sadowski, et al., "Modern code review: a case study at google", In Proceedings of IEEE/ACM 40th International Conference on Software Engineering: Software Engineering in Practice Track, May 27, 2018, pp. 181-190.
Shi, et al., "Automatic code review by learning the revision of source code", In Proceedings of the AAAI Conference on Artificial Intelligence, vol. 33, Issue 1, Jul. 17, 2019, pp. 4910-4917.
Siow, et al., "CORE: Automating Review Recommendation for Code Changes", In Proceedings of IEEE 27th International Conference on Software Analysis, Evolution and Reengineering, Feb. 18, 2020, pp. 284-295.
Svyatkovskiy, et al., "IntelliCode Compose: Code Generation using Transformer", In Proceedings of the 28th ACM Joint Meeting on European Software Engineering Conference and Symposium on the Foundations of Software Engineering, Nov. 8, 2020, pp. 1433-1443.
Thongtanunam, et al., "Who should review my code? A file location-based code-reviewer recommendation approach for Modern Code Review", In Proceedings of IEEE 22nd International Conference on Software Analysis, Evolution, and Reengineering, Mar. 2, 2015, pp. 141-150.
Tufano, et al., "An Empirical Study on Learning Bug-Fixing Patches in the Wild via Neural Machine Translation", In Journal of ACM Transactions on Software Engineering and Methodology, vol. 24, Issue 4, Sep. 2019, 29 Pages.
Tufano, et al., "Towards Automating Code Review Activities", In Proceedings of IEEE/ACM 43rd International Conference on Software Engineering, May 22, 2021, pp. 163-174.
Tufano, et al., "Using Pre-Trained Models to Boost Code Review Automation", In Repository of arXiv:2201.06850v1, Jan. 18, 2022, pp. 1-12.
Tufano, et al., "Using pre-trained models to boost code review automation", In Proceedings IEEE/ACM 44th International Conference on Software Engineering, May 25, 2022, pp. 2291-2302.
Vaswani, et al., "Attention is All You Need", In Proceedings of Advances in Neural Information Processing Systems, vol. 30, Dec. 4, 2017, 11 Pages.
Wang, et al., "CodeT5: Identifier-aware Unified Pre-trained Encoder-Decoder Models for Code Understanding and Generation", In Repository of arXiv: 2109.00859, Sep. 2, 2021, 13 Pages.
Shuai Lu, "CodeBERT", Retrieved From: https://github.com/microsoft/CodeBERT/tree/master/CodeReviewer, Aug. 8, 2022, 4 Pages.

\* cited by examiner

CODE REVIEW COMMENT GENERATION VIA RETRIEVAL-AUGMENTED TRANSFORMER WITH CHUNK CROSS-ATTENTION

BACKGROUND

Code or peer review is a process that is often utilized during software development where the source code under development is reviewed by one or more peers of the author of the source code. The source code is often inspected to discover errors, to ensure that the source code complies with best practice standards and to discover vulnerabilities, such as race conditions, malware, memory leaks, buffer overflows, format string exploits, and the like. Code review is used to find these problems which may have been overlooked in the development of the source code before the software is released.

Code review is often performed manually requiring a peer to spend a significant amount of time to understand the source code program and to review the source code. Code review requires a peer to understand the source code program's logic, functionality, style and other factors. When the code review process is performed manually, it is subject to human errors. The peer reviewer may miss very obvious errors in the source code or waste time reviewing and commenting on source code not in error.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A retrieval-augmented neural transformer model with chunk cross-attention model is trained to automate the generation of a code review comment given a proposed source code change and an aggregation of retrieved code review comments that are semantically-similar to the proposed source code change. The proposed source code change is represented in a code diff format that shows code edits proposed to a previous version of the source code program or snippet. The aggregated retrieved code review comments are retrieved from a database of pre-configured historical code review comments stored in a non-parametric memory. A retrieved code review comment is associated with code edits that are similar to the code edits of the proposed source code. Similarity is based on an encoding of the code edits of the proposed source code change closely matching an encoding of the code edits associated with the historical code review comments.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

Overview

Figure 1:
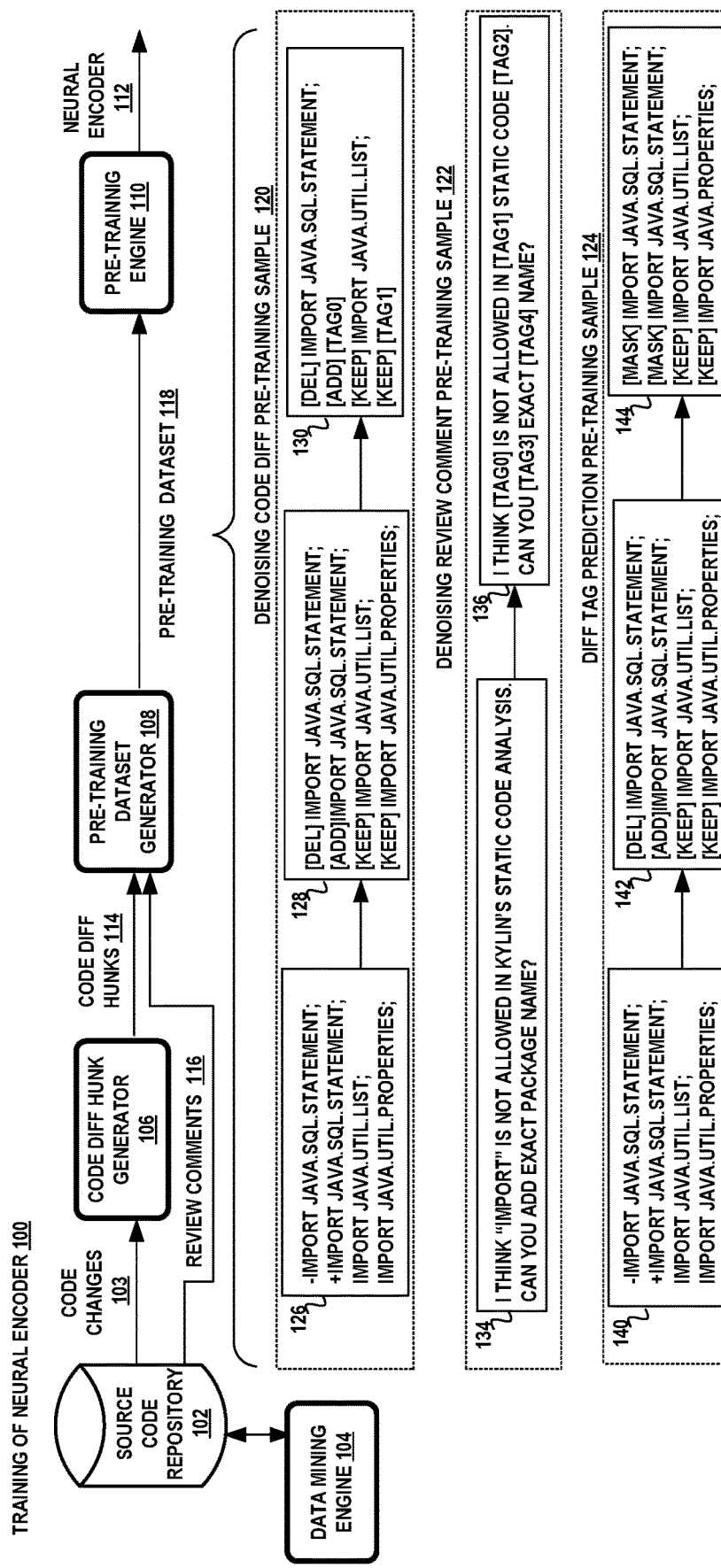
FIG. 1 is a schematic diagram illustrating an exemplary system for generating a neural encoder on historical code review comments and code diff hunks.

Aspects of the present disclosure pertain to the automation of code review comments using a retrieval-augmented neural transformer model with chunk cross-attention. The model predicts a code review comment given a proposed source code change, represented as a code diff hunk, and one or more retrieved code review comments. The code diff hunk represents proposed edits to a source code snippet with its surrounding context that has not been changed. The retrieved code review comments are obtained from a database of historical code review comments. Each historical code review comment is related to a specific set of code edits. The retrieved code review comments from the database are selected based on the semantic similarity of the code edits of a retrieved code review comment with the code edits of the code diff hunk.

The use of the retrieved code review comments as input to the retrieval-augmented neural transformer with attention model aids the model towards predicting the most relevant code review candidates without requiring a costly and large-scale training process. Training on a large training dataset increases the number of parameters used by the model to make a prediction thereby increasing the size of the model and the computing resources needed to train and deploy the model in a target system.

Code review is a process that is often part of a version-controlled source code repository. A version-controlled source code repository manages changes to the files of a file system. Each developer obtains a full copy of the files in the repository in their own branch. The original code is typically stored in a master branch in a separate computing device. The developer makes changes to their version of a file of the repository. The change to the file is noted in a commit. Before a change is merged back into the original file, the change is reviewed using the code review process.

The code review process is initiated from issuance of a pull request. A pull request is a request to merge one or more commits into a different branch of the repository, such as the master branch. Peers or reviewers review the changes and provide comments or suggestions otherwise referred to herein as the code review comment. The code review comment may include source code, natural language text, and/or a combination thereof. The developer may make additional changes to the code based on the comments submitted by the peers. The pull request is then approved and the changes are merged into the main branch of the source code repository or discarded.

A database of historical code review comments is generated from pull requests having code changes that were based on a code review comment. The code changes are represented as a code diff hunk. Each code diff hunk is partitioned into chunks, where each chunk represents a number of continuous tokens of the code diff hunk. Each chunk is encoded and used as an index into a database to access a corresponding historical code review comment. The encoding for each chunk of a code diff hunk is performed by a neural encoder trained on an unsupervised set of training data of code diff hunks with and without an associated code review comment.

At inference, the database is searched using the encoded chunks of a code diff hunk needing a code review comment. For each chunk, its approximate k-nearest code review comments are obtained using the L2 distance between an encoding of the chunk associated with a code review comment and an encoding of the code diff chunk. The retrieved code review comments are sorted in descending order by the L2 distance and the top-k retrieved code review comments are used to augment the code diff hunk input into the retrieval-augmented neural transformer model with chunk cross-attention. The value of k is pre-configured and limits the number of retrieved code review comments to at most k code review comments based on their respective L2 distance.

Attention now turns to a more detailed description of the components, methods, processes, and system for automating code review comments.

System

FIG. 1 illustrates a block diagram of an exemplary system 100 for generating the neural encoder that produces encodings or embeddings for each chunk of a code diff hunk. The neural encoder is trained on a large scale of unsupervised data derived from various code review tasks that include edits of changed code with and without code review comments. Changed code is source code that has been modified due to a comment or suggestion made by a peer in a code review. The changed code is represented with its surrounding context in a code diff format to show the edits made to the original code or previous version of the code that produced the changed code. In essence, the code diff hunk shows the edits made due to a code review comment and its surrounding unchanged context.

The system 100 includes one or more source code repositories 102, a data mining engine 104, a code diff hunk generator 106, a pre-training dataset generator 108, a pre-training engine 110 and a neural encoder 112. The data mining engine 104 mines source code repositories 102 for pull requests, commits, comments, and source code files having code changes 103 and/or associated code review comments 116. In an aspect, the code changes and code review comments are mined from publicly-available open-source code repositories. The code changes are formatted in the code diff format.

The code diff format shows the changes between two files, such as the original source code and the revised version of the original source code, in sequences of lines common to both files, interspersed with groups of differing lines. A code diff hunk 114 is a sequence of changed source code lines, including deleted lines, surrounded by a few unchanged lines or context. The code diff format is an efficient representation of the code changes since the unchanged lines occur only once. The code diff format includes diff characters at the beginning of each line. The diff characters denote changes with "−" and "+" tags and no changes with a blank space. The use of the code diff format to represent the code changes and code review comments is beneficial since the model is better able to learn the relationships between the code edits and a related code review comment. The code diff hunks are a compact and convenient format for showing the code before and the code after the change which includes the editing steps at a given granularity, such as at the line level. As such, the code diff hunk is a more natural way for model learning instead of training the model with raw source code.

The code diff hunk generator 106 receives the pull requests, commits, comments and source code files found by the data mining engine 104, extracts the relevant code changes 103 and formats them into a code diff hunk 114. A code diff hunk 114 is a sequence of lines of source code having code changes and its surrounding context. The surrounding context includes unchanged lines of code before and after the source code lines of code changes. At the beginning of each line of changed source code, there is a character that identifies the code change. A "!" represents a change between lines that correspond in the two files, a "+" represents the addition of a line, and a "−" indicates the removal of a line. A blank space represents an unchanged line.

The pre-training dataset generator 108 replaces each of the diff characters, (e.g., '+', '−', and blank space) in a code diff hunk 114 with a corresponding special token. The '+' character is replaced with the add token, [ADD], the '−' character is replaced with the delete token, [DEL], and the blank space character is replaced with the [KEEP] token.

The pre-training dataset generator 108 then uses a denoising mask objective to randomly mask tokens in the code diff hunk 114 and in each code review comment or review comments 116. The model receives the masked sequences of code diff hunks and code review comments and the model learns to reconstruct the original text by predicting the replacement of the masked tokens.

The pre-training dataset generator 108 generates the pre-training datasets 118 from the code diff hunks and the code review comments. In one or more aspects, the pre-training datasets 118 include any one or more of the following pre-training datasets: denoising code diff pre-training dataset 120; denoising review comment pre-training dataset 122; and diff tag prediction pre-training dataset 124.

The denoising code diff pre-training dataset 120 contains a number of denoising code diff pre-training samples. For example, the pre-training dataset generator 108 obtains a code diff hunk containing four lines of source code 126: −Import Java.Sql.Statement; +Import Java.Sql.Statement; Import Java.Util.List; and Import Java.Util.Properties. The pre-training generator 108 replaces the diff characters with the special characters or tokens, [ADD], [DEL], [KEEP]. This transforms the code in box 126 to the following lines of source code 128: [DEL] Import Java.Sql.Statement; [ADD] Import Java.Sql.Statement; [KEEP] Import Java.Util.List; [KEEP] Import Java.Util.Properties. The denoising objective is then applied to the code in box 128 randomly masking out certain lines of source code to generate a pre-training sample 130. The pre-training sample then becomes: [DEL] Import Java.Sql.Statement; [ADD] [TAG0]; [KEEP] Import Java.Util.List; [KEEP] [TAG1] where the tags, [TAG0] and [TAG1], have replaced full lines of source code.

The denoising review comment pre-training dataset 122 contains a number of denoising review comment pre-training samples. For example, the pre-training dataset generator 108 receives code review sample 134, "I think "import" is not allowed in Kylin's static code analysis. Can you add exact package name?" The denoising objective is applied to randomly mask out tokens in the code review sample 136. The token Import is replaced with [TAG0], the token Kylin's is replaced with [TAG1], the token Analysis is replaced with [TAG2], the token Add is replaced with [TAG3], and the token Package is replaced with [TAG4]. The code review pre-training sample 136 results in: "I think [TAG0] is not allowed in [TAG1] static code [TAG2]. Can you [TAG3] exact [TAG4] name?".

The diff tag prediction pre-training dataset 124 contains a number of diff tag prediction pre-training samples. The pre-training dataset generator 108 receives a code diff hunk 140 and replaces the diff characters in the code diff hunk with the special tokens, [ADD], [DEL], [KEEP] 142. The pre-training dataset generator 108 then randomly masks out certain special tokens 144.

For example, given the following code diff hunk 140: −Import Java.Sql.Statement; +Import Java.Sql.Statement; Import Java.Util.List; and Import Java.Util.Properties, the pre-training generator 108 replaces the diff characters with the special characters, [ADD], [DEL], [KEEP]. This transforms the code to the following lines of source code 142: [DEL] Import Java.Sql.Statement; [ADD] Import Java.Sql.Statement; [KEEP] Import Java.Util.List; [KEEP] Import Java.Util.Properties. The denoising objective then replaces the [DEL] and [ADD] tag with the [MASK] token resulting in the following diff tag prediction pre-training sample: [MASK] Import Java.Sql.Statement; [MASK] Import Java.Sql.Statement; [KEEP] Import Java.Util.List; [KEEP] Import Java.Util.Properties.

In another aspect, the neural encoder transformer model is trained through contrastive learning. Contrastive learning is self-supervised learning technique where the model learns from contrasting samples and in particular, the attributes that are common and the attributes that are different from the different types of samples. Given a contrastive pretraining dataset $D=\{q_i, p_i^+, p_{i,1}^-, \ldots, p_{i,h}^-\}$, i=0 ... N, where each sample consists of a query having an embedding of a code diff chunk; a positive sample includes an embedding of a semantically similar code diff chunk of the same intent; and a set of negative samples which are irrelevant code diff chunks of a different developer intent. The contrastive loss is then given by the following formula (negative log likelihood of the positive sample):

$$L(q_i, p_i^+, p_{i,1}^-, \ldots, p_{i,n}^-) = -\log \frac{e^{sim(q_i, p_i^+)}}{e^{sim(q_i, p_i^+)} + \sum_{i=1}^{n} e^{sim(q_i, p_{i,j}^-)}},$$

where sim is the cosine similarity between the embedding vectors.

The pre-training engine 110 receives each pre-training sample of each pre-training dataset and transforms each pre-training sample into an input embedding sequence that is input into the neural encoder. There is no particular order in which the pre-training datasets are input to train the deep learning model. Upon completion of the pre-training, the pre-training engine may test and validate the neural encoder to meet specific performance targets.

Figure 2:
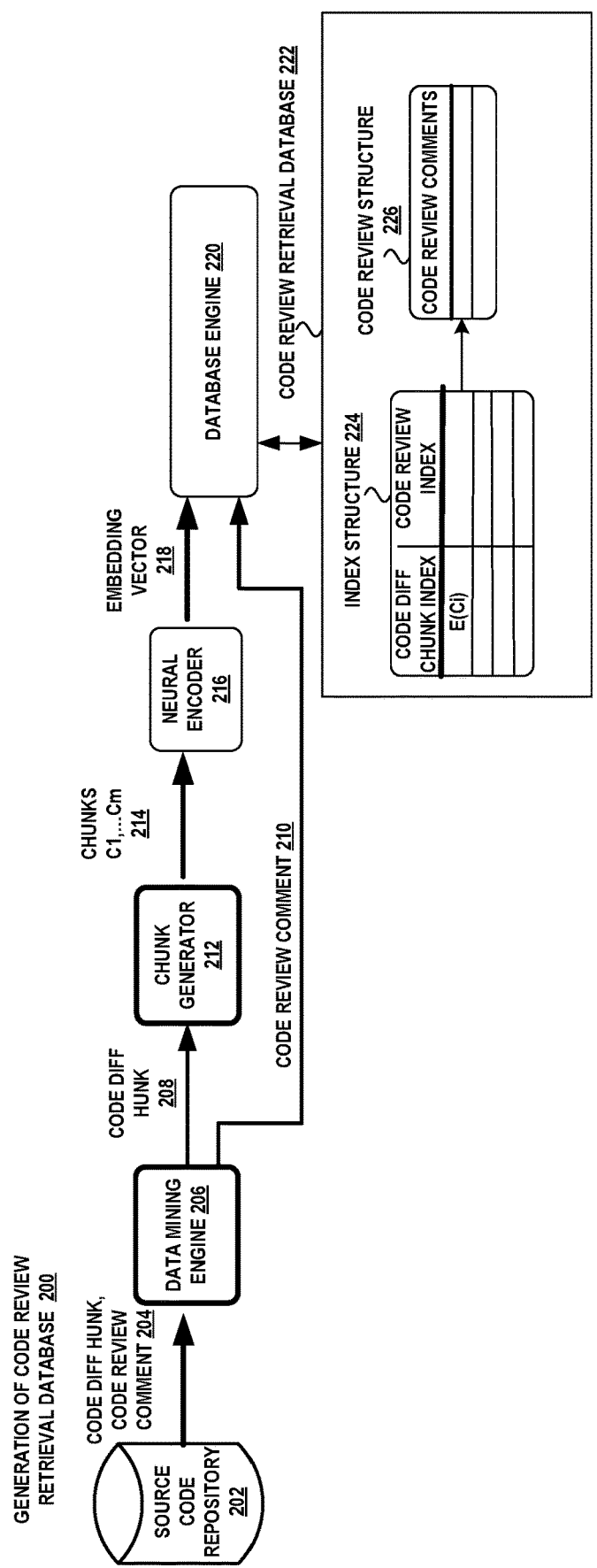
FIG. 2 is a schematic diagram illustrating an exemplary system for generating a code review retrieval database.

FIG. 2 depicts a system 200 for generating the code review retrieval database 222. There is shown a source code repository 202, a data mining engine 206, a chunk generator 212, a neural encoder 216, a database engine 220, and the code review retrieval database 222.

The data mining engine 206 extracts source code having been changed due to a code review from a source code repository 202 and extracts the associated code review comment. Code reviews that are ignored or abandoned by the author of the code with no revisions made to the code are not used and comments that are involved in multiple rounds of review are excluded.

The changed code is formatted as a code diff hunk 208 which includes the changed code and its surrounding context in the code diff format. The chunk generator 212 partitions each code diff hunk into a number of chunks 214. A code diff hunk d having n-tokens, $d=(x_1, x_2, \ldots x_n)$, is split into a sequence of chunks, $(C_1, C_2, \ldots, C_l)$, where each chunk is of size $$m = \frac{n}{l},$$

where n is the number of tokens in a code diff hunk, and l is the number of chunks. In one aspect, n=1024 tokens and l=2.

The neural encoder 216 encodes each chunk of the code diff hunk, E(Ci), into a respective embedding vector 218. The database engine 220 stores each encoded code diff chunk and its code review comment in the code review retrieval database 222. In one aspect, the code review retrieval database 222 consists of an index structure 224 and a code review structure 226. The index structure 224 includes indices that point to a corresponding code review comment stored in the code review structure 226. There will be multiple indices that can access a particular code review comment since each encoded chunk of a code diff hunk points to the same code review comment.

Figure 3:
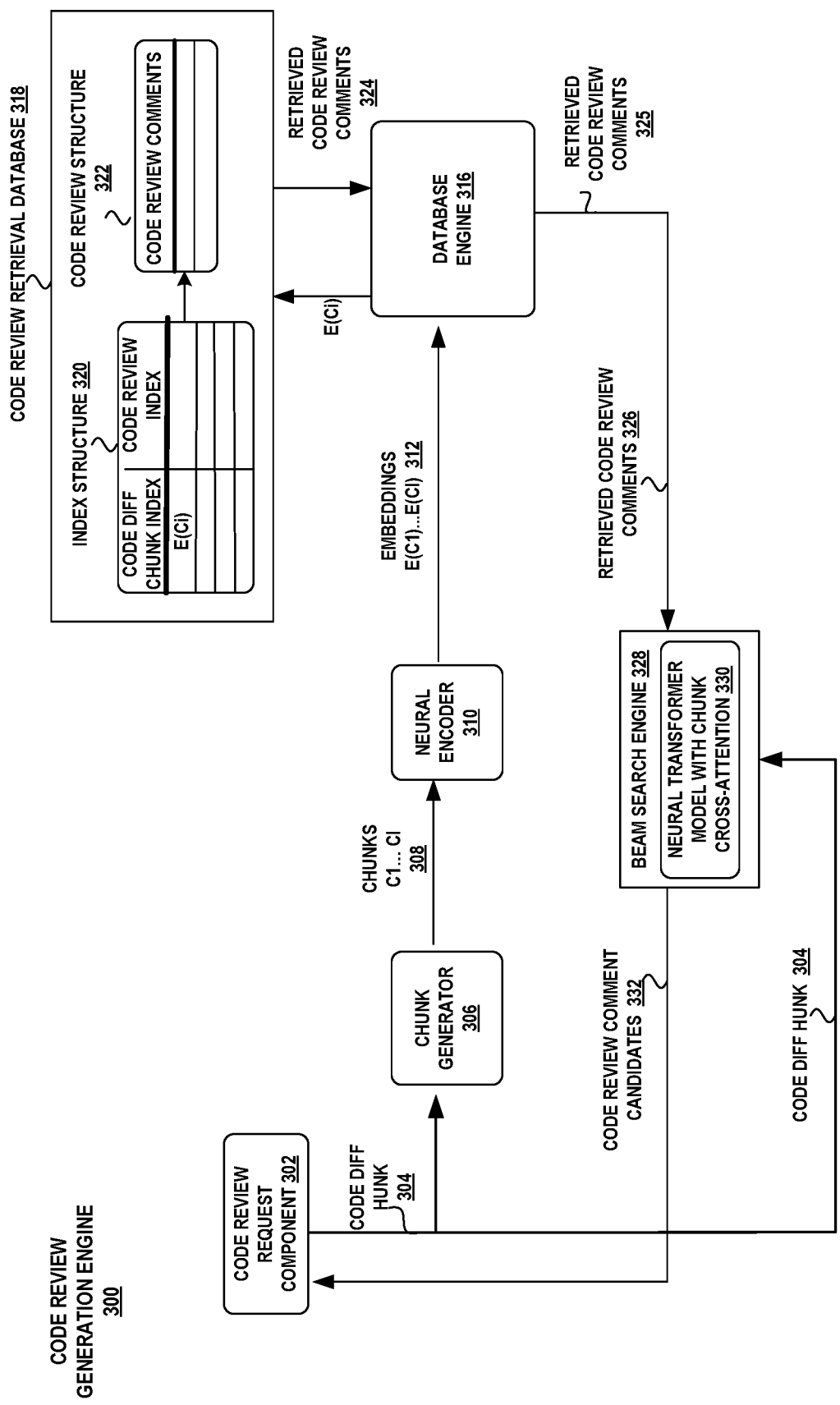
FIG. 3 is a schematic diagram illustrating an exemplary system for automatically generating a code review comment for a given code diff hunk and one or more retrieved code review comments.

FIG. 3 illustrates an exemplary configuration of the code review generation engine 300. The code review generation engine 300 produces one or more candidate code review comments 332 automatically for a given code diff hunk 304. In an aspect, the code review generation engine 300 includes a code review request component 302, a chunk generator 306, a neural encoder 310, a database engine 316, a beam search engine 328 having a neural transformer model with chunk cross attention, and a code review retrieval database 318.

The code review request component 302 interacts with an application that seeks a code review comment for a code diff hunk representing a changed code and its surrounding context. The chunk generator 306 receives the code diff hunk 304 and partitions the code diff hunk 304 into m chunks, $C_1, \ldots C_l$ 308. Each chunk, Ci, is encoded by the neural encoder 310 and each encoded chunk or embedding 312 is used as a search key by the database engine 316 to retrieve the top-k semantically-similar code review comments, where k is a predefined parameter.

The code review retrieval database 318 includes an index structure 320 and a code review structure 322. The index structure 320 includes a code diff chunk index and a pointer to the corresponding code review comment in the code review structure 322. The encoded code diff chunk is used to retrieve the top-k closest semantically-similar code reviews that are augmented to the input to the neural transformer model with chunk cross-attention 330. A beam search engine 328 uses the neural transformer model with chunk cross-attention 330 to predict one or more code review candidates 332. The code review candidates 332 are returned back to the code review request component 302 and to the application requesting the code review comment.

In an aspect, the neural encoder 310 is a neural transformer model with attention configured with multiple stacked encoder blocks. Each encoder block includes a multi-head self-attention layer and a feed-forward neural network layer. The model is trained to learn the relationships between the edits made in a changed code, as presented in the code diff format, and a code review comment. To this end, the neural encoder generates encodings or embeddings that relate source code edits to a code review comment. The neural encoder is trained offline and once trained, the model is kept frozen in order to avoid having to periodically recompute the embeddings over the entire database.

Attention now turns to a more detailed description of the deep learning model used to generate a code review.

Neural Transformer Model

In an aspect, the deep learning model is a neural transformer model with attention. A neural transformer model with attention is one distinct type of machine learning model. Machine learning pertains to the use and development of computer systems that are able to learn and adapt without following explicit instructions by using algorithms and statistical models to analyze and draw inferences from patterns in data. Machine learning uses different types of statistical methods to learn from data and to predict future decisions. Traditional machine learning includes classification models, data mining, Bayesian networks, Markov models, clustering, and visual data mapping.

Deep learning differs from traditional machine learning since it uses multiple stages of data processing through many hidden layers of a neural network to learn and interpret the features and the relationships between the features. Deep learning embodies neural networks which differs from the traditional machine learning techniques that do not use neural networks. Neural transformers models are one type of deep learning that utilizes an attention mechanism. Attention directs the neural network to focus on a subset of features or tokens in an input sequence thereby learning different representations from the different positions of the tokens in an input sequence. The neural transformer model handles dependencies between its input and output with attention and without using recurrent neural networks (RNN) (e.g., long short-term memory (LSTM) network) and convolutional neural networks (CNN).

It should be noted that the term neural transformer model, neural transformer model with attention, neural transformer model with chunk cross-attention, and retrieval-augmented neural transformer model are used interchangeably. It should also be noted that the aspects disclosed herein are described with respect to neural transformer model with attention. However, the techniques are not limited to these types of neural networks and can be applied to other types of deep learning models that utilize a neural network with an attention mechanism, such as a memory efficient transformer (e.g., Poolingformer).

A neural transformer model with attention uses an attention mechanism to relate the significance of different positions of an input embedding sequence to compute a representation of the sequence. Attention is used to decide which parts of the input embedding are important for each token, especially when decoding long sequences since the encoder is limited to encoding a fixed-size vector. Attention mechanisms gather information about the relevant context of a given token and then encode that context into a vector which represents the token. It is used to identity the relationships between tokens in the long sequence while ignoring other tokens that do not have much bearing on a given prediction.

The attention mechanism is a mapping of a query and a set of key-value pairs to an output. The query (Q), key (K), value (V), and output are vectors. Each value is associated with a weight computed by a compatibility function of the query with its paired key. The output is the weighted sum of the values.

In one aspect, the attention mechanism is a scaled dot-product attention function which is described mathematically as follows:

$$\text{Attention } (Q, K, V) = \text{softmax}\left(\frac{QK^T}{\sqrt{d_k}}\right)V,$$

where the input consists of queries Q and keys K of dimension $d_k$, and values V of dimension $d_v$. Q is a matrix that contains the query or vector representation of one token in a sequence, K is the vector representations of all tokens in the sequence, and V is the vector representations of all the tokens in the sequence.

The queries, keys and values are linearly projected h times in parallel with $d_v$ output values which are concatenated to a final value:

$$\text{MultiHead}(Q,K,V)=\text{Concat}(\text{head}_1, \ldots ,\text{head}_h)W^O,$$

where $\text{head}_i=\text{Attention}(QW_i^Q, KW_i^K, VW_i^V)$, with parameter matrices $W_i^Q \in \mathbb{R}^{d_{model} \times d_k}$, $W_i^K \in \mathbb{R}^{d_{model} \times d_k}$, $W_i^V \in \mathbb{R}^{d_{model} \times d_k}$, and $W^O \in \mathbb{R}^{hd_v \times d_{model}}$.

Self-attention is an attention mechanism that relates different positions of a token of a single input embedding sequence. The queries, keys and values are generated from the same input embedding sequence. Cross-attention mixes two separate embedding sequences of the same dimension. In cross-attention, one of the sequences serves as the query input and the other embedding sequence serves as the key and value inputs. In an aspect, the query input to the encoder cross-attention is a linear projection of embeddings of the chunks of the diff hunk needing a code review and the key and value inputs are linear projections of the embedding sequence of the aggregated code reviews.

Figure 4:
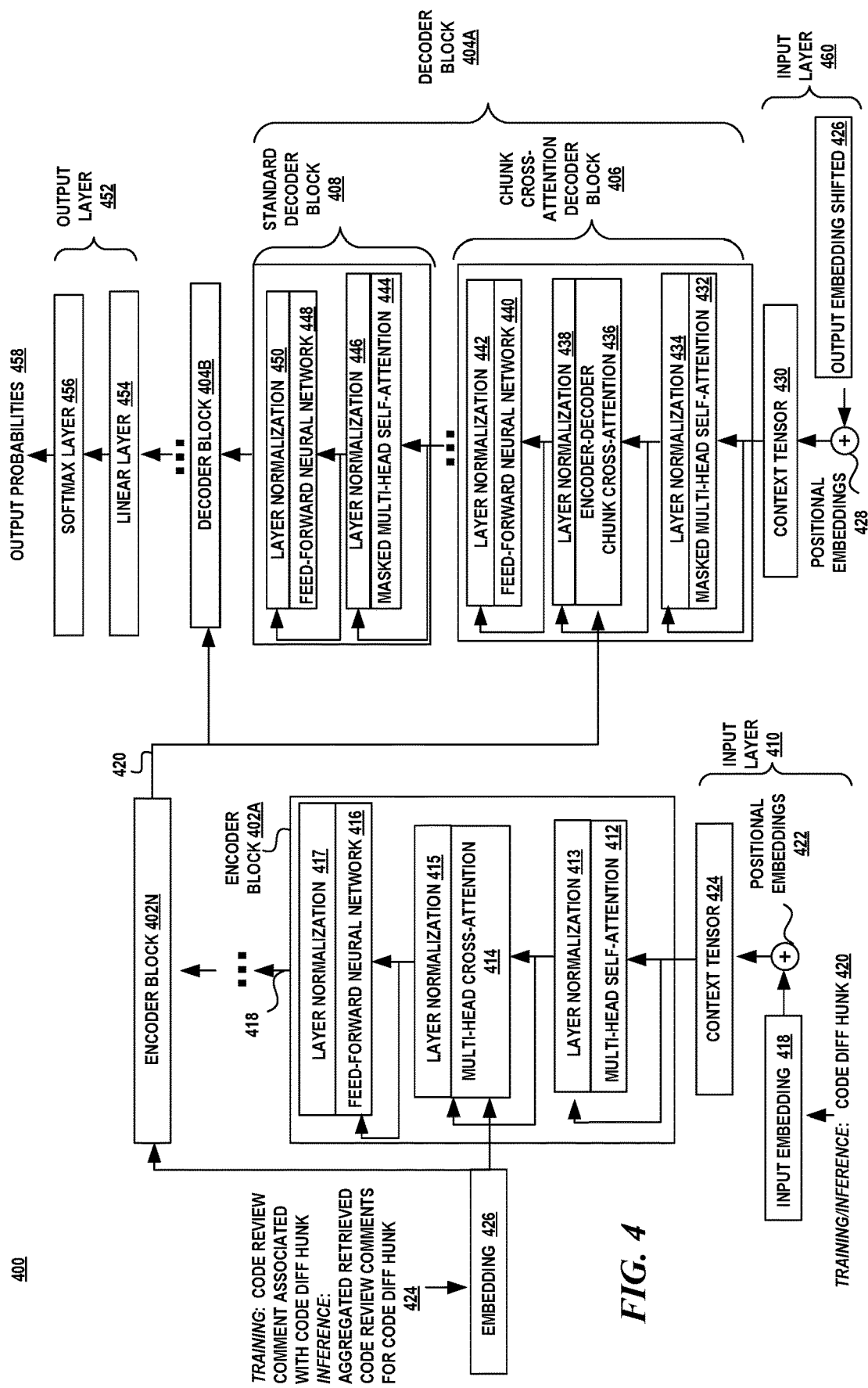
FIG. 4 is a schematic diagram illustrating an exemplary architecture of a neural transformer model with chunked cross-attention used to automate the generation of a code review comment.

FIG. 4 shows an exemplary structure of the neural transformer model with chunk cross-attention in an encoder-decoder configuration. The neural transformer model 400 contains multiple stacked encoder blocks 402A, 402B ("402") coupled to multiple stacked decoder blocks 404A, 404B ("404"). In an aspect, a decoder block 404 includes a chunk cross-attention decoder block 406 coupled to two stacked standard decoder blocks 408.

An encoder block 402 consists of an input layer 410, a multi-head self-attention layer 412, a multi-head cross-attention layer 414, and a feed-forward network layer 416. The initial inputs to an encoder block 402 are the input embeddings 418 of an input sequence, such a code diff hunk 420. In order to retain the order of the tokens in the input embedding 418, positional embeddings 422 are added to the input embedding 418 forming a context tensor 424.

An encoder block 402A, 402B consists of three layers. The first layer includes a multi-head self-attention component 412 followed by layer normalization component 413. The second layer includes a multi-head cross-attention layer 414 followed by a layer normalization component 415. The third layer includes a feed-forward neural network 416 followed by a layer normalization component 417.

The context tensor 424 is input into the multi-head self-attention component 412 of the first encoder block 402A with a residual connection to the layer normalization component 413. The output of the layer normalization component 413 is input to the multi-head cross-attention layer 414 with a residual connection to a layer normalization component 415.

The multi-head cross-attention layer 414 receives an embedding 426 of the aggregation of the retrieved code reviews for the input code diff hunk 424. The embedding is a tensor of the shape B×K×M×N, where B represents the batch size, K denotes the number of retrieved code reviews for the code diff chunk, M denotes the maximum number of chunks per retrieved code reviews, and N represents the maximum number of tokens per chunk. In an aspect, K=2 neighbors, M=2, and N=512.

The output of the multi-head cross-attention layer is input to the feed-forward neural network 416 with another residual connection to layer normalization component 417. The output of the encoder block 402 is a set of hidden representations 418. The set of hidden representations 418 is then sent through additional encoder blocks. At the last encoder block, the set of hidden representations 420 is sent to the chunk cross-attention decoder block 406.

A decoder block 404A-404B ("404) includes a chunked cross-attention decoder block 406 and two standard decoder blocks 408. The chunked cross-attention decoder block 406 includes a masked multi-head self-attention layer 432, an encoder-decoder chunked cross-attention layer 436 and a feed-forward network layer 414 with a layer normalization component, 434, 438, 442, following each of these layers. The standard decoder block 408 includes a masked multi-head self-attention layer 444 and a feed-forward layer 448 with respective layer normalization components 446, 450.

Initially, the masked multi-head self-attention component 432 receives a <START> token and thereafter receives the output embeddings of the previous timestep shifted. The masked multi-head self-attention component 432 masks the output embeddings from future time steps. The encoder-decoder chunk cross-attention layer 436 receives queries from the previous decoder layer and the memory keys and values 420 from the output of the last encoder block 402B. In this manner, the decoder block 404 can attend to every position of the input sequence. The feed-forward neural network 440 processes each output encoding separately. A layer normalization component 434, 438, 442 is used between the layers in order to normalizes the inputs across the features.

The output layer of the decoder 452 includes a linear layer 454 and a softmax layer 456. The linear layer 454 is a neural network that receives the unscaled output of the last decoder block 404B and turns them into logits. A logit is an unnormalized prediction of the feed-forward output from the last decoder block. The softmax layer 456 applies the softmax function to the logits of the linear layer to approximate a probability distribution for the model's vocabulary. The probability distribution is used to predict the next token to succeed in the output sequence.

In one aspect, the neural transformer model with chunk cross-attention 400 contains a stack of twelve encoder blocks and a stack of twelve decoder blocks which are arranged into a neural transformer block. The output of each encoder block is passed onto the next encoder block and processed. Each decoder block receives the attention weights computed from the last encoder block. The use of multiple stacked encoder blocks and decoder blocks increases the model's capacity allowing the model to learn increasing levels of abstraction.

In one aspect, the decoder block is configured with a chunk cross-attention decoder block followed by two standard decoder blocks. A neural transformer model configured with encoder and decoder blocks and a neural transformer model configured with only decoder blocks perform better in certain situations. In order to provide a model that obtains the benefit of both configurations for any situation, the neural transformer model shown in FIG. 4 interleaves both standard decoder blocks with self-attention with chunk cross-attention decoder blocks to achieve the benefits of both configurations.

In other aspects, the decoder block may include several stacked chunk cross-attention decoder blocks. In other aspects, the decoder block may include a different mixture of chunk cross-attention decoder blocks and standard decoder blocks.

Methods

Attention now turns to a more detailed description of the methods used in the system for retrieval-augmented code completion. It may be appreciated that the representative methods do not necessarily have to be executed in the order presented, or in any particular order, unless otherwise indicated. Moreover, various activities described with respect to the methods can be executed in serial or parallel fashion, or any combination of serial and parallel operations. In one or more aspects, the method illustrates operations for the systems and devices disclosed herein.

Figure 5:
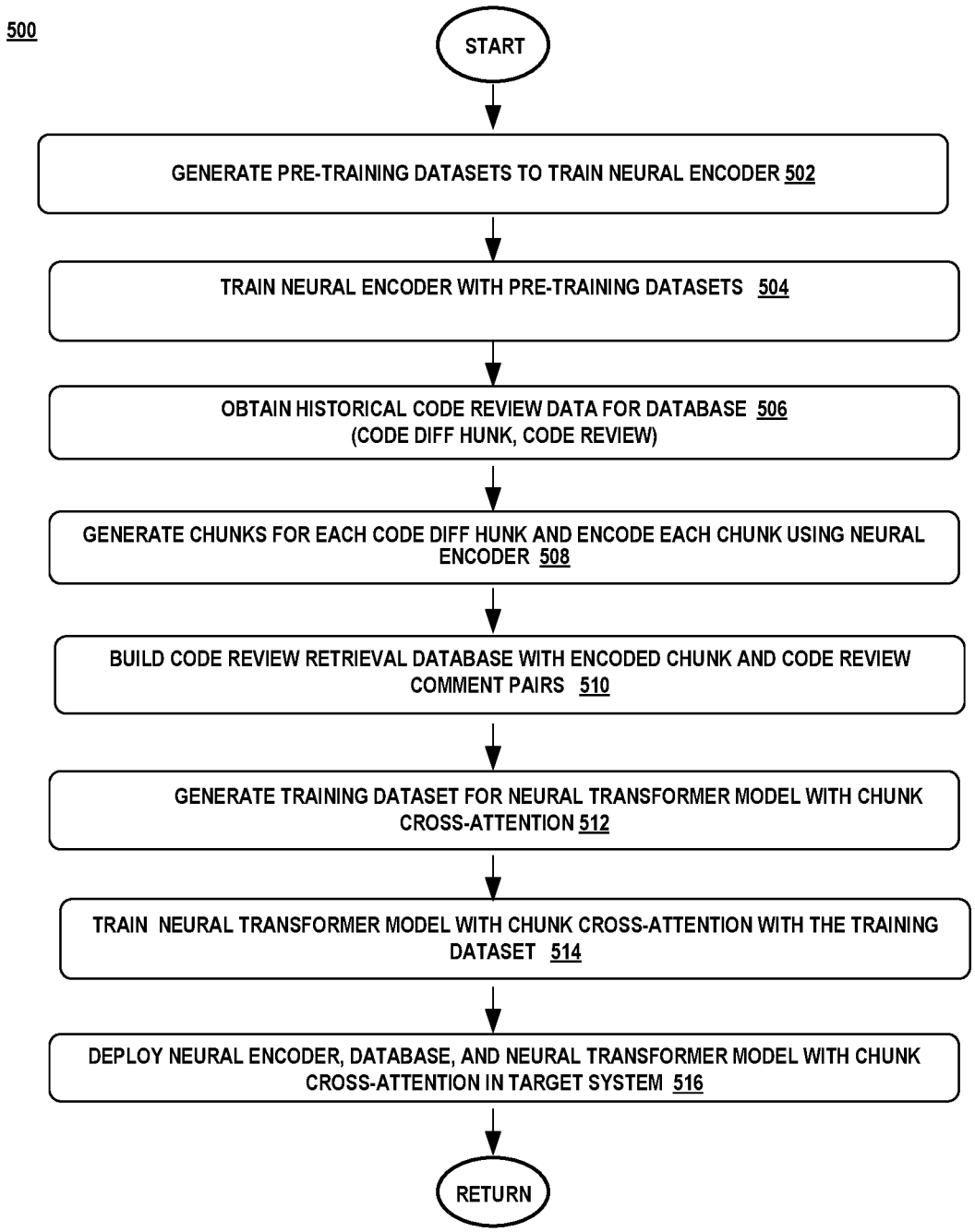
FIG. 5 is a flow diagram illustrating an exemplary method of generating components of a code review generation engine including training the neural encoder, generating the code review retrieval database, and training the neural transformer model with attention.

FIG. 5 illustrates an exemplary method for generating the components of the code review generation engine 500. The neural encoder is trained to learn to predict embeddings for each chunk of a code diff hunk on unsupervised pre-training datasets. The pre-training datasets are derived from code review comments and source code having been changed based on a code review comment or without a code review comment. The samples of the pre-training datasets are masked or denoised for the neural encoder to learn to predict the masked or denoised tokens in the changed code or code review comment. The pre-training data is formatted in a code diff format so that the neural encoder learns the relationship between code edits made and its corresponding code review comment.

Turning to FIGS. 1 and 5, the data mining engine 104 mines various source code repositories 102 for pull requests, commits, comments, code reviews, source code, and data that is used to generate the pre-training datasets. The data mining engine 104 extracts changed code derived from the differences between two versions of a source code file found in commits of a pull request. The changed code may include a code review comment which includes comments describing the reasons for the change, suggestions for remedies, and so forth. (Collectively, block 502).

In an aspect, the GitHub Representational State Transfer ("REST") Application Programming Interface ("APE") is used to collect pull requests from projects of a source code repository. The GitHub REST API allows access to branches, commits, pull request, code diff, review comments and the like. An Exploit Those Code Reviews ("ETCR") tool is used to collect metadata of pull requests and review comments that is used to query, via the GitHub API, code changes, including the original file, new file, and code diff, corresponding to the review comments. The code changes and review comments are collected to build the pre-training datasets for the neural encoder (Collectively, block 502).

A code diff shows the changes between two versions of the same source code file in the diff format. The code diff is extracted from a pull request. Alternatively, the code diff may be generated from software tools such as the diff utility of the Unix operating system and other such tools. From the code diff, a code diff hunk is produced which contains the code diff and a number of source code lines surrounding the code diff that have not been changed. The diff hunk generator 106 replaces the diff characters in the diff hunk (e.g., "+", "−", " ") with a corresponding special token (e.g., [DEL], [ADD], [KEEP]). (Collectively, block 502).

The pre-training dataset generator 108 then performs masked denoising on certain features of a pre-training dataset. The masked denoising is based on the cloze task of evaluating human language-learners' proficiency, in which humans are given a foreign language with missing words, and are asked to correctly choose the missing word. The benefit of the mask denoising in pre-training is that the model learns the desired edits or code review language in an unsupervised fashion, but also is bi-directional in the sense that it learns the relationships of the edits and words in the code review both before and after their occurrence. (Collectively, block 502).

For the diff tag prediction pre-training dataset 124, the pre-training dataset generator 108 receives a code diff hunk and randomly masks certain tags (e.g., [DEL], [ADD], [KEEP]) with a mask tag, [MASK]. For the denoising code diff pre-training dataset 120, the pre-training dataset generator 108 receives a code diff hunk and randomly masks out lines of source code which are replaced with a respective tag (e.g., [TAG0]). For the denoising review comment pre-training dataset 122, the pre-training dataset generator 108 receives a code review comment and randomly masks out different tokens within the review with a respective tag (e.g., [TAG1]). (Collectively, block 502).

Upon completion of the generation of the pre-training datasets, the neural encoder 112 is trained with each of the samples of the pre-training datasets. Each of the pre-training samples of a pre-training dataset is an input sequence that is transformed into a sequence of input embeddings. The input sequence is tokenized and each token in replaced with a respective embedding transforming the input sequence into a sequence of input embeddings. An embedding is a learned representation for the text-based tokens where tokens that have a common meaning have a common representation. An embedding is a mapping of discrete categorical variables to a vector of continuous numbers. There is an embedding for each token of the source code and the natural language text of the code reviews used in the pre-training datasets. Each token embedding has a corresponding positional embedding. The neural transformer model does not read each token sequentially and as such, has no knowledge of the token's position in a sequence without additional position information. The positional embedding is used to encode position information about a token's position in a sequence into the neural transformer model. (Collectively, block 504).

Neural transformer models are trained iteratively, making multiple passes over the training dataset before converging to a minimum. An epoch represents the entire pre-training dataset passed forwards and backwards through the neural encoder transformer blocks once. Since the training dataset is very large, it is partitioned into smaller batches. The training is iterative and the entire training dataset is passed through the neural transformer with attention in multiple iterations. Each training iteration includes forward propagation, loss calculation, backpropagation steps followed by updating the weights. The training dataset is partitioned into batches with each batch of sequences running through the pre-training process. (Collectively, block 504).

For each input sequence of each batch in each epoch, the T-ordered sequences of tokens are then mapped into numeric vectors and then into respective token embeddings and positional embeddings. Initial values are generated for the token embedding and positional embeddings of each input sequence which are then used to form a context tensor. Thereafter, the neural transformer model learns the values for each embedding through backpropagation. (Collectively, block 504).

Upon the completion of the training phase, the embeddings for each token and the positional embeddings are saved into respective matrices for later use. There is a token embedding matrix, We, that contains an embedding vector for each token $t_i$, i=0 . . . V of a particular programming language, and a positional embedding matrix, Wp, that contains an embedding vector $P_j$, j=0 . . . T, for each position, where V is the size of the model vocabulary and T is the length of the token sequence. (Collectively, block 504).

At the completion of each batch, the parameters of the neural encoder are updated at a preconfigured frequency denoted as Naccum. Naccum is a gradient accumulation frequency and in one aspect has a value of 8. The parameters include the token embeddings and the positional embeddings which are stored in a respective embedding matrix. (Collectively, block 504).

Next, the neural encoder model 112 is validated. Before the neural encoder model 112 is trained, a set of hyperparameters was selected randomly and then tuned to achieve a desired performance. The neural encoder model 112 is tested using a validation dataset to determine the appropriate hyperparameters settings to achieve a desired goal. When the desired goal is not achieved, one or more hyperparameters are adjusted and the training is repeated until the target goal is achieved. Perplexity on the validation set is calculated to validate the performance of the model with respect to the learning the masked out original text. (Collectively, block 504).

Turning to FIGS. 2 and 5, the code review retrieval database 222 is constructed from historical code review comments. The historical code review comments are extracted from a version-controlled source code repository 202. Source code files having been changed due to a code review comment are extracted and the changed code is transformed into a code diff hunk. (Collectively, block 506).

Each code diff hunk is segmented into a number of chunks and each chunk of a code diff hunk is encoded using the neural encoder 216 (block 508).

The code review retrieval database 222 is constructed from the encoded chunks and their corresponding code review comment. The code review retrieval database 222 includes an index structure 224 and a code review structure 226. The index structure 224 stores an index and a pointer to a corresponding code review comment stored in the code review structure 226. The index is the encoded code diff chunk and the pointer points to the code review comment of the corresponding code diff chunk. (Collectively, block 510).

A training dataset for the neural transformer model with chunk cross attention is generated. The training dataset includes a code diff hunk and its associated code review comment. The training dataset is then applied to the neural transformer model with chunk cross attention. (Collectively, blocks 512, 514).

Referring to FIGS. 4 and 5, each code diff hunk 420 is transformed into a first input sequence and its related code review comment is transformed into a second input sequence. Each of these input sequences are transformed into a sequence of input embeddings. Each input sequence is tokenized and each token in replaced with a respective embedding transforming each respective input sequence into a sequence of input embeddings 418, 426. (Collectively, block 514).

Similar to the training of the neural encoder described above, the neural transformer model with chunk cross-attention is trained iteratively, making multiple passes over the training dataset before converging to a minimum. The training is iterative and the entire training dataset is passed through the neural transformer with attention in multiple iterations. Each training iteration includes forward propagation, loss calculation, backpropagation steps followed by updating the weights. The training dataset is partitioned into batches with each batch of sequences running through the training process. (Collectively, block 514).

For each input sequence of each batch in each epoch, the T-ordered sequences of tokens are then mapped into numeric vectors and then into respective token embeddings and positional embeddings. Initial values are generated for the token embedding and positional embeddings of each input sequence which are then used to form a respective context tensor. Thereafter, the neural transformer model learns the values for each embedding through backpropagation. (Collectively, block 514).

The first encoder block of the neural transformer model takes the context tensor 424 as input and passes it through the multiple layers of multi-head self-attention 412, multi-head cross-attention 414, and feed-forward neural network 416 to finally produce a set of hidden representations. For the multi-head cross-attention layers 414, a linear projection of the retrieved code review embedding 426 serves as the query and the key and value pairs are generated from the input embedding 418. If there are additional encoder blocks, the output of each encoder block is passed onto the next encoder block with the output of the last encoder block 402B producing the set of hidden representations 420. The set of hidden representations is passed onto each decoder block. (Collectively, block 514).

Initially, the first decoder block 406 receives the <START> token and thereafter the decoder blocks take a shifted sequence of an output embedding as input 426. The output embeddings shifted by one position ensures that the predictions to position T depend only on the known outputs at positions less than T. Starting with the first token of the output sequence, the tokens are passed through the self-attention and into the chunked cross-attention layer before normalization layers. To perform chunked cross-attention, the input of chunked cross-attention is partitioned into attending chunks $H_i^+$, which holds the intermediary embeddings of the last token in chunk $C_i$ and of the first m−1 tokens in $C_{i+1}$. Then the cross attention is computed between $H_i^+$, a tensor of shape (B×K)×N×D, serving as the query for the chunked cross-attention layer, and the outputs of encoder, a tensor of shape (B×K)×(R×N)×D, which serve as the key and value pairs for the attention, where B is the batch size, K is the number of chunks per sequence, R is the number of retrieved code reviews, N is the sequence length, and D is the embedding dimension. (Collectively, block 514).

The feed forward neural networks in the encoder blocks and the decoder blocks are trained iteratively, making multiple passes over the training dataset before converging to a minimum. Each training iteration includes forward propagation, loss calculation, backpropagation steps followed by updating the weights by calculating the weight gradients. The loss function estimates the loss or error which is used to compare how good or bad the predicted results are. In one aspect, a categorical cross-entropy loss function is used. Once the loss is calculated, it is propagated backwards to the hidden layer that contributed directly to the output. In backpropagation, the partial derivatives of the loss function with respect to the trainable parameters are determined. The weight gradients are calculated as the difference between the old values and the new values of the weights. The weights are adjusted to make the loss as small as possible using a gradient descent technique. In one aspect, a Stochastic Gradient Descent (SGD) method is the optimization algorithm used to find the values of parameters of the function that minimizes the loss function. A backpropagation through time (BPTT) algorithm may be used to update the weights. (Collectively, block 514).

Upon the completion of the training and validation of the neural transformer model with chunk cross-attention, the components of the code review generation engine, neural encoder, database, and neural transformer model with chunk cross-attention are deployed into a target system (block 516).

Figure 6:
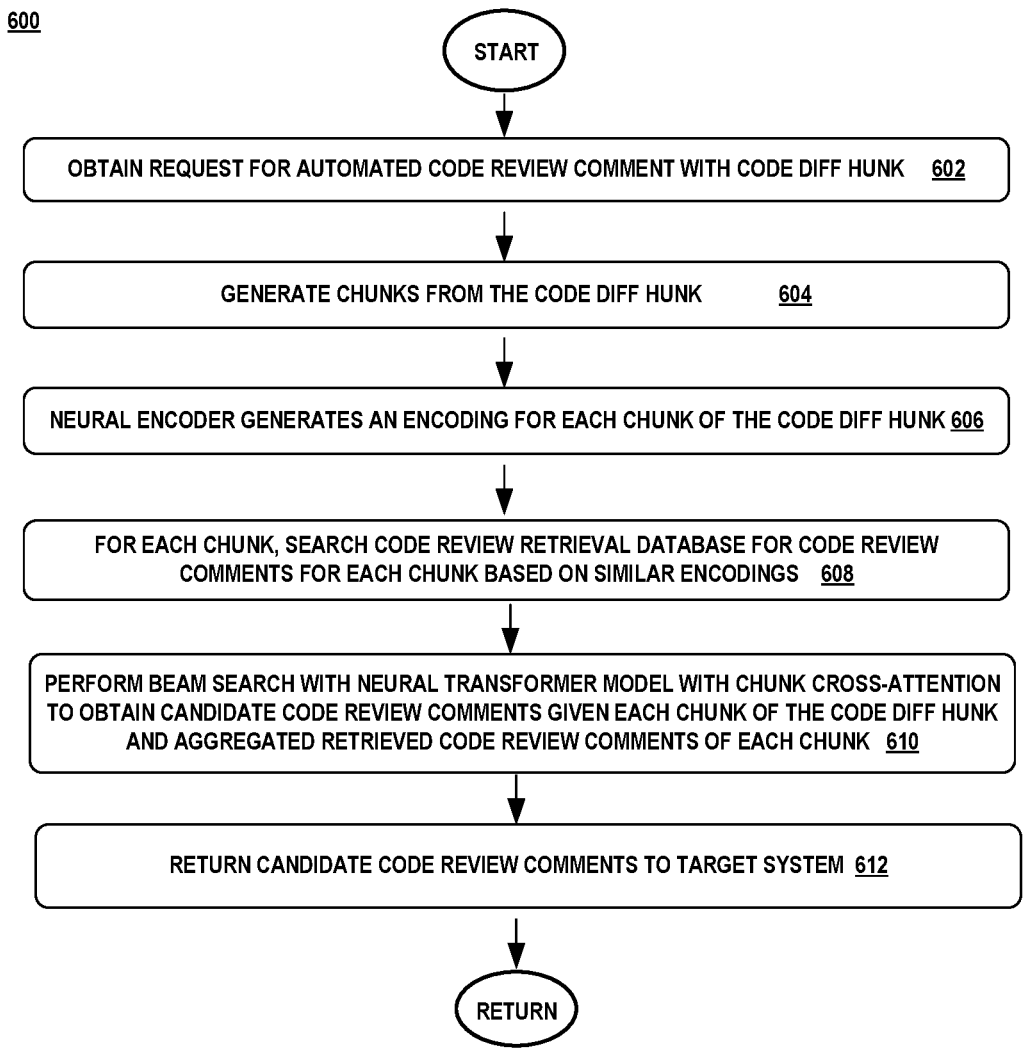
FIG. 6 is a flow diagram illustrating an exemplary method of the code review generation engine during inference.

Attention now turns to a more detailed discussion of the generation of a code review using the code review generation engine. FIG. 6 illustrates an exemplary method of the inference process of the code review generation engine.

The inference phase of the automated code review system is the process that generates the code review comment candidates using the retrieval-augmented neural transformer model with chunk cross-attention. The inference phase uses a beam search to search for the code review comment candidates. This is because the decoder of the neural transformer model generates each token one at a time. The neural transformer model factorizes the probability of the target tokens in an input sequence into a product of conditional probabilities for each token using the formula: $p(t_1, \ldots t_m|s) = \Pi_{i=1}^{m} p(t_i|t_1, \ldots, t_{i-1}, s)$, where $t_i$ represents the token at timestep i, and s represents the input sequence. During inference, the calculation of $\arg\max_t p(t|s)$ is complex and extremely time consuming making the model difficult for real-time applications. Beam search is an approximation algorithm that performs faster.

The beam search uses the probability distribution generated by the neural transformer model with chunk cross-attention to identify the top k tokens likely to be the next token in a candidate code review comment. The beam search expands the search by instantiating new partial sequences using each of the selected tokens identified by the neural transformer model's probability distribution. The search continues generating new partial sequences from the top k tokens identified by the output distributions from the neural transformer model until the search ends. The search may end when the end-of-sequence appears as the most probable next token.

The beam search uses a breadth-first search to build a search tree. The search tree is composed of nodes at one or more inference levels. Each node represents a probability distribution generated by the neural transformer model for the tokens in the model vocabulary. At each level, only the top k tokens having the highest probabilities from the output distribution generated by the neural transformer model are expanded to the next inference level. The variable k is preconfigured and referred to as the beam width. Each of the k tokens is then expanded into a search that updates the current context sequence with the selected token to input into the neural transformer model to generate an additional probability distribution for the next token in a sequence. This process is repeated until the end-of-sequence token is predicted as being the next likely token candidate.

Turning to FIGS. 3 and 6, the code review generation engine 300 receives through the code review request component 302 a request for an automated code review comment given a code diff hunk 304 (block 602). The chunk generator 306 partitions the code diff hunk into a number of chunks (block 604). The neural encoder 310 generates an encoding for each chunk of the code diff hunk (block 606).

The database engine 316 uses the encoding for each chunk to search the code review retrieval database 318 for one or more retrieved code review comments. Since a chunk represents a portion of a code diff hunk, there are often several code review comments associated with a chunk. The database engine searches the code diff chunk indices of the code review retrieval database 318 for similar encodings to the encoding of a code diff chunk. In one aspect, the similarity is computed based on an L2 score that is the absolute value of the difference between the encoding of the chunk from the encoding of the index. Those indices having the smallest scores are considered and their associated code review comments are retrieved. From those retrieved code review comments, those having the top-k smallest scores are selected as the retrieved code review comments for the chunk. (Collectively, block 608).

Each retrieved code review comment for a chunk is aggregated into a first input embedding sequence and the code diff hunk is represented as a second input embedding sequence. The first input embedding and second input embedding are input into the neural transformer model with chunk cross-attention. The first input embedding is input into the chunk cross-attention layer of each encoder block and the second input embedding in input into the multi-head self-attention component of the first encoder block.

The beam search engine 328 performs a beam search using the neural transformer model with chunk cross-attention given the two input embedding sequences to generate code review comment candidates 332 (block 610). There may be more than one candidate code review comment generated. The top-k chunk review comment candidates are selected and returned to the code review request component 302 and the target system (block 612).

Figure 7:
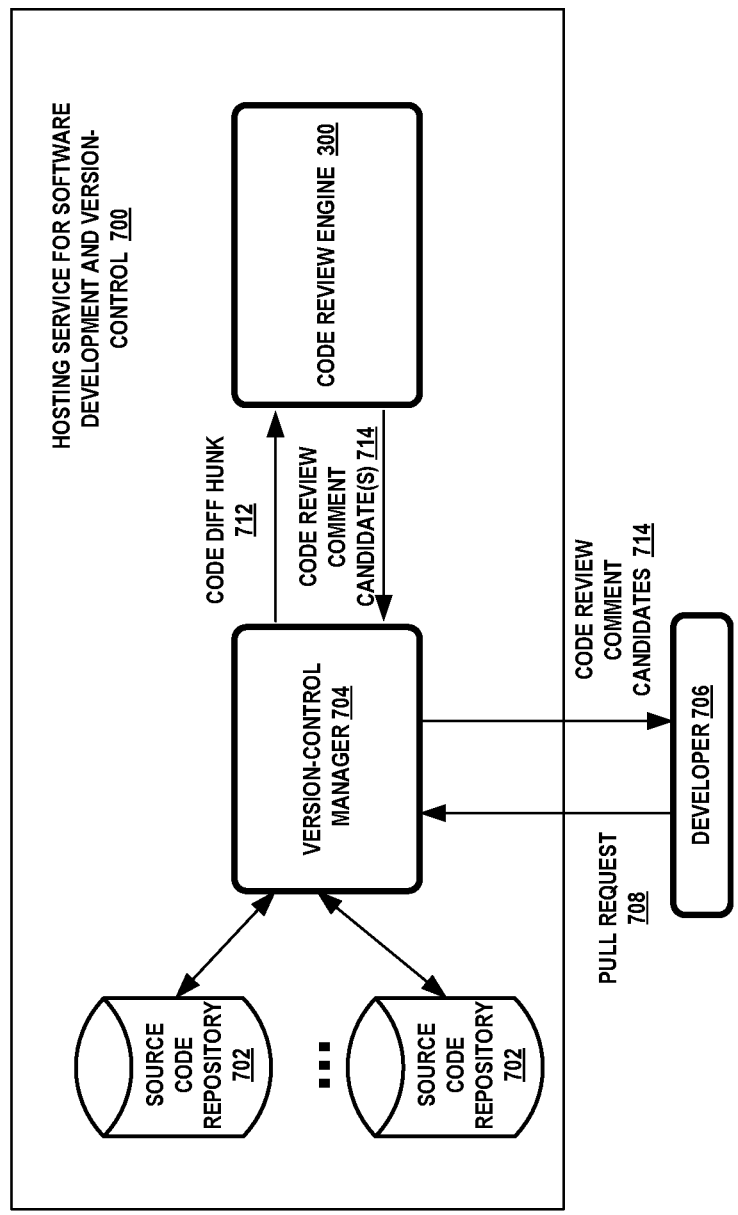
FIG. 7 is a schematic diagram illustrating usage of the code review generation system in a version-controlled source code repository.

Attention now turns to a description of an exemplary system employing the code review generation engine. Turning to FIG. 7, there is shown a hosting service for software development and version control 700. The hosting service 700 may be a web service accessed through a network, such as the Internet. The hosting service 700 includes one or more source code repositories 702, a version-control manager 704, and the code review generation engine 300. The source code repositories 702A-702N ("702") store source code files, documents and other data. The version-control manager 704 tracks and manages changes made to the files of the source code repositories 702.

The hosting service 700 interacts with a developer 706 having a copy of a source code file stored in one of the source code repositories. The developer 706 may initiate a pull request 708 to commit changes back to a version of the source code file stored in the hosting service. The version-control manager 704 initiates a request to the code review generation engine 300 for a code review comment for the changed code of the pull request. The version-control manager 704 generates a code diff hunk 712 which is sent to the code review generation engine 300. The code review generation engine 300 generates one or more code review comment candidates 714 which are sent to the developer 706. The developer 706 may submit additional pull requests including additional changes and eventually the changes are merged into the source code file of the hosting service.

Exemplary Operating Environment

Figure 8:
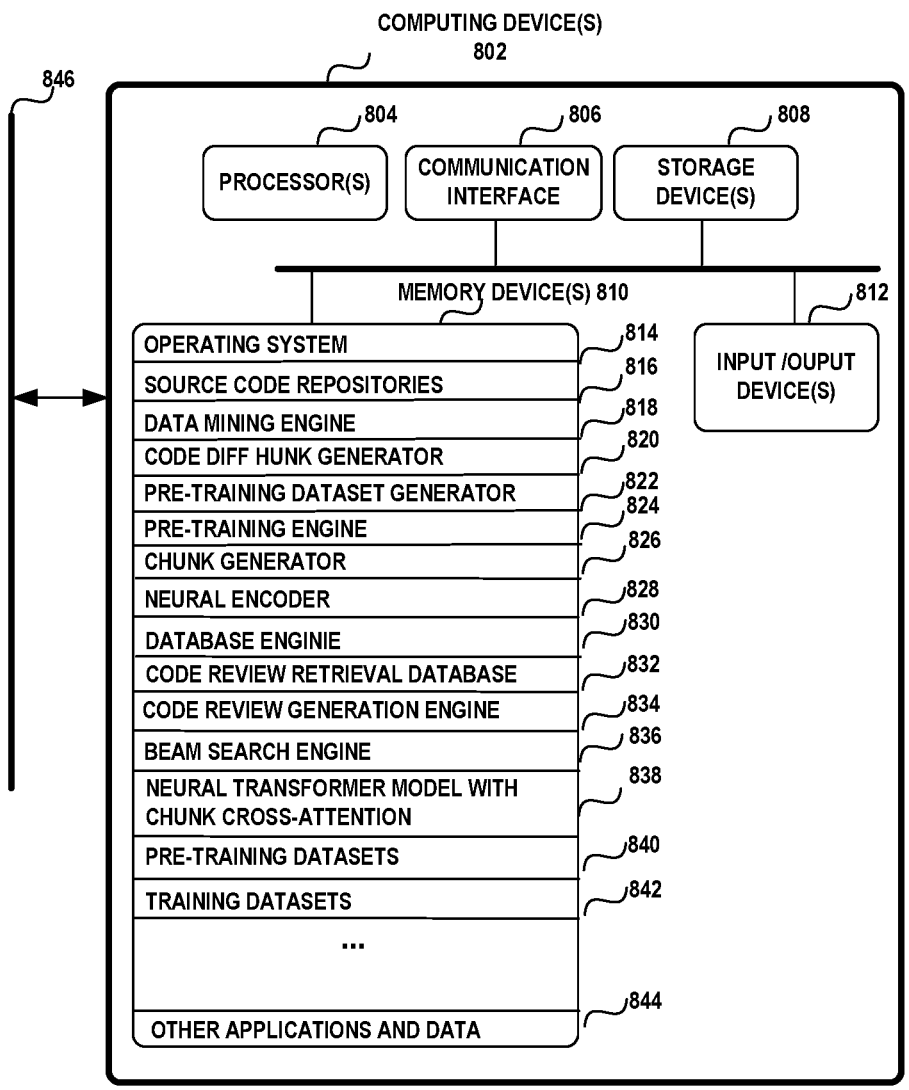
FIG. 8 is a block diagram illustrating an exemplary operating environment.

Attention now turns to a discussion of an exemplary operating environment 800. FIG. 8 illustrates an exemplary operating environment 800 in which one or more computing devices 802 are used. However, it should be noted that the aspects disclosed herein is not constrained to any particular configuration of the computing devices. In another aspect, one or more computing devices may be configured to develop the components of the code review generation engine and one or more other computing devices may be configured to deploy the code review generation engine into a target system.

A computing device 802 may be any type of electronic device, such as, without limitation, a mobile device, a personal digital assistant, a mobile computing device, a smart phone, a cellular telephone, a handheld computer, a server, a server array or server farm, a web server, a network server, a blade server, an Internet server, a work station, a mini-computer, a mainframe computer, a supercomputer, a network appliance, a web appliance, a distributed computing system, multiprocessor systems, or combination thereof. The operating environment 800 may be configured in a network environment, a distributed environment, a multi-processor environment, or a stand-alone computing device having access to remote or local storage devices.

A computing device 802 may include one or more processors 804, one or more communication interfaces 806, one or more storage devices 808, one or more memory devices or memories 810, and one or more input/output devices 812. A processor 804 may be any commercially available or customized processor and may include dual microprocessors and multi-processor architectures. A communication interface 806 facilitates wired or wireless communications between the computing device 802 and other devices. A storage device 808 may be computer-readable medium that does not contain propagating signals, such as modulated data signals transmitted through a carrier wave. Examples of a storage device 808 include without limitation RAM, ROM, EEPROM, flash memory or other memory technology, CD-ROM, digital versatile disks (DVD), or other optical storage, magnetic cassettes, magnetic tape, magnetic disk storage, all of which do not contain propagating signals, such as modulated data signals transmitted through a carrier wave. There may be multiple storage devices 808 in the computing devices 802. The input/output devices 812 may include a keyboard, mouse, pen, voice input device, touch input device, display, speakers, printers, etc., and any combination thereof.

A memory device or memory 810 may be any non-transitory computer-readable storage media that may store executable procedures, applications, and data. The computer-readable storage media does not pertain to propagated signals, such as modulated data signals transmitted through a carrier wave. It may be any type of non-transitory memory device (e.g., random access memory, read-only memory, etc.), magnetic storage, volatile storage, non-volatile storage, optical storage, DVD, CD, floppy disk drive, etc. that does not pertain to propagated signals, such as modulated data signals transmitted through a carrier wave. A memory 810 may also include one or more external storage devices or remotely located storage devices that do not pertain to propagated signals, such as modulated data signals transmitted through a carrier wave.

A memory device 810 may contain instructions, components, and data. A component is a software program that performs a specific function and is otherwise known as a module, program, and/or application. The memory device 810 may include an operating system 814, one or more source code repositories 816, a data mining engine 818, a code diff hunk generator 820, a pre-training dataset generator 822, pre-training engine 824, chunk generator 826, neural encoder 828, database engine 830, code review retrieval database 832, code review generation engine 834, beam search engine 836, neural transformer model with chunk cross-attention 838, pre-training datasets 840, training datasets 842, and other applications and data 844.

A computing device 802 may be communicatively coupled via a network 846. The network 846 may be configured as an ad hoc network, an intranet, an extranet, a virtual private network (VPN), a local area network (LAN), a wireless LAN (WLAN), a wide area network (WAN), a wireless WAN (WWAN), a metropolitan network (MAN), the Internet, a portion of the Public Switched Telephone Network (PSTN), plain old telephone service (POTS) network, a wireless network, a WiFi® network, or any other type of network or combination of networks.

The network 846 may employ a variety of wired and/or wireless communication protocols and/or technologies. Various generations of different communication protocols and/or technologies that may be employed by a network may include, without limitation, Global System for Mobile Communication (GSM), General Packet Radio Services (GPRS), Enhanced Data GSM Environment (EDGE), Code Division Multiple Access (CDMA), Wideband Code Division Multiple Access (W-CDMA), Code Division Multiple Access 2000, (CDMA-2000), High Speed Downlink Packet Access (HSDPA), Long Term Evolution (LTE), Universal Mobile Telecommunications System (UMTS), Evolution-Data Optimized (Ev-DO), Worldwide Interoperability for Microwave Access (WiMax), Time Division Multiple Access (TDMA), Orthogonal Frequency Division Multiplexing (OFDM), Ultra Wide Band (UWB), Wireless Application Protocol (WAP), User Datagram Protocol (UDP), Transmission Control Protocol/Internet Protocol (TCP/IP), any portion of the Open Systems Interconnection (OSI) model protocols, Session Initiated Protocol/Real-Time Transport Protocol (SIP/RTP), Short Message Service (SMS), Multimedia Messaging Service (MMS), or any other communication protocols and/or technologies.

Technical Effect

Aspects of the subject matter disclosed herein pertain to the technical problem of automating code review comments for proposed code changes made to a source code program using a deep learning model. The technical features associated with addressing this problem is the retrieval of code review comments that are semantically similar to the code edits made to the proposed source code changes of a source code program. The retrieved code review comments are an additional input to the model which aids the model towards predicting more relevant code review comments for the proposed code changes.

The retrieved code review comments are obtained by using chunks instead of the entire code diff hunk. The search for semantically-similar code review comments is at the smaller granularity of a chunk since a code diff hunk may consist of multiple semantically distinct portions of code. Working with chunks as queries for retrieval is therefore more accurate, especially for longer code diff hunks. The model can pay attention to one chunk at a time, and certain chunks might be more relevant to predicting the output than the others. This is why the model takes an aggregation of the retrieved code reviews for all chunks of a code diff hunk.

The technical effect achieved is the reduction of the memory size of the deep learning model and a reduction in the amount of computing resources needed to deploy the model without a loss in the accuracy of the predicted results.

Conclusion

A system is disclosed comprising: one or more processors; and a memory that stores one or more programs that are configured to be executed by the one or more processors, the one or more programs including instructions to perform actions that: obtain a proposed source code change to a source code program in a code diff format, wherein the code diff format includes code edits made to the source code program; access a database of code review comments, wherein each code review comment of the database is associated with code edits; retrieve a code review comment for the proposed source code change of the source code program from the database of code review comments, wherein the retrieved code review comment is associated with code edits similar to the code edits of the proposed source code change; and generate a candidate code review comment for the proposed source code change from a deep learning model given the retrieved code review comment and the proposed source code change.

In an aspect, the one or more programs include instructions to perform actions that: generate an encoding for each code edit associated with a code review comment of the database and an encoding of the proposed source code change. In an aspect, the one or more programs include instructions to perform actions that: determine that the retrieved code review comment is associated with code edits similar to the code edits of the proposed source code change by comparing the encoding of the code edits associated with the retrieved code review comment with the encoding of the proposed source code change.

In an aspect, the encoding of the code edits associated with the retrieved code review comment is closest to the encoding of the proposed source code change. In an aspect, the one or more programs include instructions to perform actions that: partition the proposed source code change into a plurality of chunks; and retrieve a code review comment for each chunk based on each retrieved code review comment associated with code edits similar to the code edits of a respective chunk.

In an aspect, each chunk is associated with an encoding of code edits associated with a respective chunk, each code review comment of the database is associated with an encoding, and the retrieval for a code review comment for each chunk is based on a difference between the chunk encoding and the encoding associated with each code review comment.

In an aspect, each chunk encoding and each encoding associated with each code review comment are generated from a same neural encoder. In an aspect, the deep learning model includes a neural transformer model with self-attention and cross-attention.

A computer-implemented method is disclosed, comprising: obtaining a code diff hunk representing code edits to a source code program; accessing a plurality of code review comments, each code review comment associated with an encoding of associated code edits; partitioning the code diff hunk into a plurality of chunks; encoding each chunk of the plurality of chunks; retrieving, for each chunk, one or more code review comments from the plurality of code review comments, wherein a retrieved code review comment is associated with an encoding that is similar to a respective chunk encoding; and generating a predicted code review for the code diff hunk from a deep learning model, wherein the deep learning model is given the one or more retrieved code review comments of each of the plurality of chunks and the code diff hunk.

In an aspect, the computer-implemented method of claim 9, further comprises: accessing a neural encoder to generate each chunk encoding and the encoding associated with each of the plurality of code review comments.

In an aspect, the neural encoder is a neural encoder transformer model with attention. In an aspect, the computer-implemented method further comprises: determining similarity between the one or more retrieved code review comments and each chunk based on a distance score, wherein the distance score is based on a difference between a chunk encoding and an encoding associated with a retrieved code review comment.

In an aspect, the computer-implemented method further comprises: sorting the retrieved code review comments for each chunk of the code diff hunk based on a respective distance score; and selecting from the sorted retrieved code review comments, select ones of the sorted retrieved code review comments based on the distance scores.

In an aspect, the computer-implemented method of claim 13, further comprises: aggregating the selects one of the retrieved code review comments; and inputting the aggregated retrieved code review comments to the deep learning model. In an aspect, the deep learning model is a neural transformer model with attention.

A computer-implemented method is disclosed comprising: obtaining a training dataset of a plurality of changed code, each of the plurality of changed code having an associated code review comment; configuring a deep learning model with at least one encoder block coupled to at least one decoder block, wherein the at least one encoder block includes a self-attention layer and a cross-attention layer; and training the deep learning model to predict a code review comment for a given changed code with the training dataset, wherein the self-attention layer of the at least one encoder block receives an input embedding of the changed source code, wherein the cross-attention layer of the at least one encoder block receives an embedding of the associated code review of the changed source code.

In an aspect, the at least one decoder block includes at least one cross attention decoder block coupled to at least one standard decoder block, wherein the at least one cross attention decoder includes a self-attention layer and a cross-attention layer, wherein the at least one standard decoder block includes a self-attention layer, wherein the cross-attention layer receives output from the at least one encoder block.

In an aspect, the computer-implemented method further comprises: representing each of the changed code in a format having code edits and surrounding context. In an aspect, the computer-implemented method further comprises: extracting the changed code and code review comments from pull requests of a source code repository. In an aspect, the deep learning model is a neural transformer model with attention.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It may be appreciated that the representative methods described herein do not necessarily have to be executed in the order presented, or in any particular order, unless otherwise indicated. Moreover, various activities described with respect to the methods can be executed in serial or parallel fashion, or any combination of serial and parallel operations.

What is claimed:

1. A system comprising:
one or more processors; and
a memory that stores one or more programs that are configured to be executed by the one or more processors, the one or more programs including instructions to perform actions that:
obtain a proposed source code change to a source code program in a code diff format, wherein the code diff format includes code edits made to the source code program;
access a database of code review comments, wherein each code review comment of the database is indexed by code edits associated with a respective code review comment;
retrieve a code review comment for the proposed source code change of the source code program from the database of code review comments, wherein the retrieved code review comment has code edits similar to the code edits of the proposed source code change; and
generate a candidate code review comment for the proposed source code change from a deep learning model, wherein the candidate code review comment comprises a plurality of tokens, wherein the deep learning model generates each token of the candidate code review comment given the retrieved code review comment and the proposed source code change.

2. The system of claim 1, wherein the one or more programs include instructions to perform actions that:
generate an encoding for each code edit associated with a code review comment of the database and an encoding of the proposed source code change.

3. The system of claim 2, wherein the one or more programs include instructions to perform actions that:
determine that the retrieved code review comment has code edits similar to the code edits of the proposed source code change by comparing the encoding of the code edits associated with the retrieved code review comment with the encoding of the proposed source code change.

4. The system of claim 3, wherein the encoding of the code edits associated with the retrieved code review comment is closest to the encoding of the proposed source code change.

5. The system of claim 1, wherein the one or more programs include instructions to perform actions that:
partition the proposed source code change into a plurality of chunks; and
retrieve a code review comment for each chunk based on each retrieved code review comment associated with code edits similar to the code edits of a respective chunk.

6. The system of claim 5,
wherein each chunk is associated with an encoding of code edits associated with a respective chunk,
wherein each code review comment of the database is associated with an encoding, and
wherein the retrieval of a code review comment for each chunk is based on a difference between the chunk encoding and the encoding associated with each code review comment.

7. The system of claim 6, wherein each chunk encoding and each encoding associated with each code review comment are generated from a same neural encoder.

8. The system of claim 1, wherein the deep learning model includes a neural transformer model with self-attention and cross-attention.

9. A computer-implemented method, comprising:
obtaining a code diff hunk representing code edits to a source code program;
accessing a plurality of code review comments, each code review comment associated with an encoding of associated code edits;
partitioning the code diff hunk into a plurality of chunks;
encoding each chunk of the plurality of chunks;
retrieving, for each chunk, one or more code review comments from the plurality of code review comments based on a retrieved code review comment having an encoding that is similar to a respective chunk encoding; and
generating a predicted code review for the code diff hunk from a deep learning model, wherein the predicted code review comprises a plurality of tokens, wherein the deep learning model generates each token of the predicted code review based on the one or more retrieved code review comments of each of the plurality of chunks and the code diff hunk.

10. The computer-implemented method of claim 9, further comprising:
accessing a neural encoder to generate each chunk encoding and the encoding associated with each of the plurality of code review comments.

11. The computer-implemented method of claim 10, wherein the neural encoder is a neural encoder transformer model with attention.

12. The computer-implemented method of claim 10, further comprising:
determining similarity between the one or more retrieved code review comments and each chunk based on a distance score, wherein the distance score is based on a difference between a chunk encoding and an encoding associated with a retrieved code review comment.

13. The computer-implemented method of claim 9, further comprising:
sorting the retrieved code review comments for each chunk of the code diff hunk based on a respective distance score; and
selecting from the sorted retrieved code review comments, select ones of the sorted retrieved code review comments based on the distance scores.

14. The computer-implemented method of claim 13, further comprising:
aggregating the selects one of the retrieved code review comments; and
inputting the aggregated retrieved code review comments to the deep learning model.

15. The computer-implemented method of claim 9, wherein the deep learning model is a neural transformer model with attention.

16. A computer-implemented method, comprising:
obtaining a training dataset of a plurality of changed code, each of the plurality of changed code having an associated code review comment;
configuring a deep learning model with at least one encoder block coupled to at least one decoder block, wherein the at least one encoder block includes a self-attention layer and a cross-attention layer; and
training the deep learning model to predict a code review comment for a given changed code with the training dataset, wherein the self-attention layer of the at least one encoder block receives an input embedding of the changed code, wherein the cross-attention layer of the at least one encoder block receives an embedding of the associated code review comment of the changed code.

17. The computer-implemented method of claim 16, wherein the at least one decoder block includes at least one cross attention decoder block coupled to at least one standard decoder block, wherein the at least one cross attention decoder includes a self-attention layer and a cross-attention layer, wherein the at least one standard decoder block includes a self-attention layer, wherein the cross-attention layer receives output from the at least one encoder block.

18. The computer-implemented method of claim 16, further comprising:
representing each of the changed code in a format having code edits and surrounding context.

19. The computer-implemented method of claim 16, further comprising:
extracting the changed code and code review comments from pull requests of a source code repository.

20. The computer-implemented method of claim 16, wherein the deep learning model is a neural transformer model with attention.

* * * * *